United States Patent [19]
Smith

[11] 4,207,533
[45] Jun. 10, 1980

[54] ELECTRONIC PHOTOMETER
[76] Inventor: John I. Smith, 4505 Ellicott St., NW., Washington, D.C. 20016
[21] Appl. No.: 895,751
[22] Filed: Apr. 12, 1978
[51] Int. Cl.$^2$ .......................... G01J 1/42; G06G 7/24
[52] U.S. Cl. .................................. 328/145; 307/230; 356/226; 356/223
[58] Field of Search ...................... 356/223, 226, 227; 354/24; 328/145; 324/140 D; 307/229, 230

[56] References Cited
U.S. PATENT DOCUMENTS

| | | | |
|---|---|---|---|
| 3,320,530 | 5/1967 | Pearlman | 328/145 X |
| 3,448,289 | 6/1969 | Harris | 307/230 |
| 3,992,622 | 11/1976 | Numata et al. | 328/145 X |
| 4,045,142 | 8/1977 | Watanabe | 356/226 X |

*Primary Examiner*—Rolf G. Hille
*Attorney, Agent, or Firm*—Gajarsa, Liss & Conroy

[57] ABSTRACT

An economical Cds photoresistor is connected to the input of an operational amplifier. Logging diodes are connected in a feedback configuration with the operational amplifier through a galvanometer meter. The log of the ratio of the input currents to the operational amplifier is independent of supply voltage thereby permitting the use of a wide tolerance battery supply. The input of the operational amplifier and the meter are referenced to a voltage divider. A feedback connection regulates meter current independently of meter resistance that varies strongly with ambient temperature changes. Light-emitting diodes provide regulation against battery voltage variation, light for meter scale illumination, and an inherent, unfailingly diagnostic battery-check response.

11 Claims, 2 Drawing Figures

ELECTRONIC PHOTOMETER

FIELD OF THE INVENTION

The present invention relates to light measurement apparatus and more particularly to an electronic photometer.

BRIEF DESCRIPTION OF THE PRIOR ART

In a wide variety of applications, precise light measurements of small image areas become necessary. For example, when a photographic enlargement is to be made, it is advantageous to take readings of the projected image to predetermine exposure. Since small areas, such as a person's face, may be of critical importance, it is necessary to be able to pinpoint a light measurement on such an area.

Electronic photometers are available on the market which are capable of taking light readings at a small area of a projected image. Characteristically, they include photogalvanic devices such as photomultiplier tubes for sensing light and producing an electrical signal therefrom. Circuits including photomultiplier tubes are rather costly because of the inherent high cost of photomultiplier tubes and because of the high-voltage power supply they require. In certain prior art photomultiplier tube circuits, diodes have been connected in a feedback configuration to generate log functions that drive a readout meter. The necessity of a high voltage dc power supply, and the inherent instability of photomultiplier tube transducers, make this approach unattractive, especially for hand-held instrumentation.

SUMMARY OF THE INVENTION

The present invention is capable of achieving precise measurements of light intensity in small image areas while utilizing very economical circuitry which is extremely reliable. The present invention is the first known precision photometer including a photoresistor connected in circuit with an operational amplifier and logging diodes. Photoresistive, and not photogalvanic devices are used, providing greater stability and increased economy in manufacture.

The function of the circuitry is to achieve logs of currents flowing through the photosensor and its reference resistor, the ratio of such currents being dependent upon purely resistive components in the circuitry. The log relationship of these input currents can be demonstrated to be independent of the excitation voltage, so that a battery which has a wide tolerance, such as a conventional 9-volt "transistor" battery, may be used to excite the measurement circuit.

The output of the operational amplifier utilized in the present invention is connected to a meter which in turn has its output referenced to a voltage divider, which enables a single battery to provide the bipolar power supply required by the circuit and the operational amplifier. In addition, the positive half of the split power supply thus effected is used to energize the photoresistor and its reference resistor.

By connecting the meter of the present invention in a feedback loop with the operational amplifier, the meter current is predetermined by feedback and is utterly independent of the resistance of the meter coil itself (which coil resistance varies widely with temperature fluctuations). Conventionally, a second operational amplifier is required to thus render the meter current independent of temperature.

A special feature of the invention is the use therein of a resistance comparator, providing an output voltage proportional to a ratio of resistance and independent of excitation voltages.

Light-emitting diodes (LED's) are used in the present invention both to light the dial and as part of the voltage divider. Further, the inherent voltage regulation ability of the LED obviates matching the logging diodes connected to the operational amplifier.

A further quality of the present invention resides in a self-checking feature for battery condition. When the photoresistor is masked from light, an imbalance results which causes a unique negative reading of the meter if the battery is in good condition. There is no need for a separate battery checking circuit or separate switch. As a result, the present invention has an inherent diagnostic capability for checking its battery.

It is accordingly a primary object of the present invention to provide an electronic photometer overcoming the disadvantages of the prior art.

An additional object is to provide an electronic photometer having a wide dynamic range providing an output reading directly in f/stops.

Yet another object is to provide an electronic photometer having logging diodes, said photometer providing accurate output information whether the diodes are or are not matched.

Still another object is to utilize a meter in the feedback circuit of an op amp, thus to overcome the conventional requirement for a second op amp for stabilization of the meter current.

It is a further object to provide an electronic photometer capable of utilizing a standard power source and which is insensitive to wide variations in output power from the source.

An additional object of the invention is to utilize LED's to regulate the excitation voltage of the logging diodes of an electronic photometer, to compensate for the unmatched characteristics thereof.

Another object of the invention is to provide an inherent battery check in an electronic photometer.

Still a further object is the provision of illumination for the meter face used in an electronic photometer.

Another object is the use of a single means in an electronic photometer to perform the combined functions of regulation of the excitation voltage for unmatched logging diodes, determination of power source condition, and illumination of the meter face thereof.

BRIEF DESCRIPTION OF THE FIGURES

The above-mentioned objects, features and advantages of the present invention will be more clearly understood from the following specification and appended claims when considered in conjunction with the accompanying drawings, in which:

DETAILED DESCRIPTION OF THE INVENTION

Figure 1:
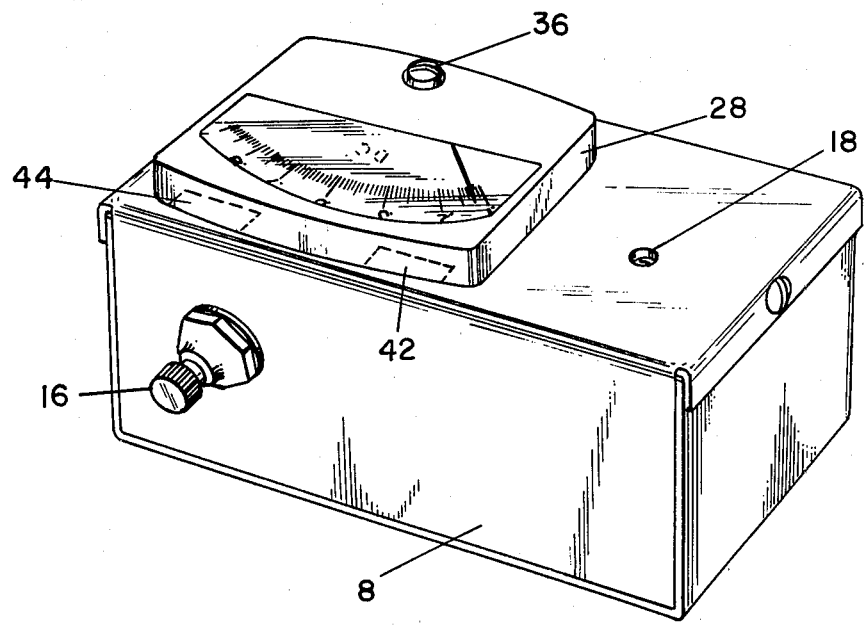
FIG. 1 is a view illustrating the external appearance of the present electronic photometer.
Figure 2:
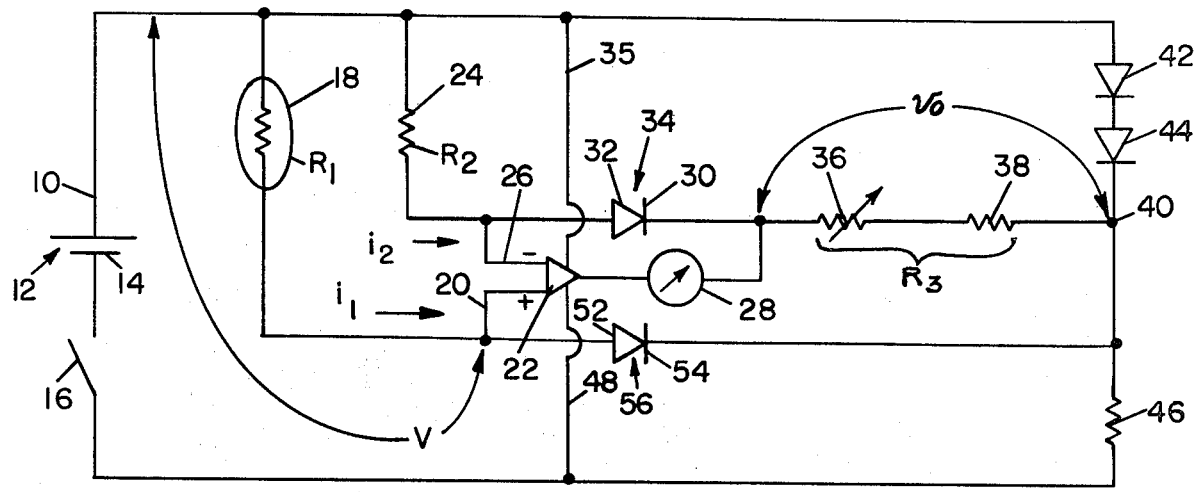
FIG. 2 is an electrical schematic diagram illustrating the components for the present invention.

Referring to the figures and more particularly to FIG. 1 thereof, the present invention is seen to include a housing 8 which encloses the electronic photometer circuitry shown in FIG. 2. A window is formed in the housing to expose photoresistor 18 which senses light intensity at an image plane. A conventional meter 28 is suitably mounted to the housing 8 and, upon depression of an on-off switch 16, the circuitry will operate to cause readings on the meter 28. In actual use of the device shown in FIG. 1, the photometer may be placed on an enlargement easel and the enlarged image would then be projected against the housing 8, in the vicinity of the photoresistor 18. The housing may be painted in a light color, such as white, so that the image may be clearly seen on the housing and the photoresistor 18 positioned at a precise point where a light reading is to be taken.

Referring to FIG. 2, the electronic circuitry for the present invention is illustrated. A dc battery 12 is illustrated which includes a positive terminal 10 and a negative terminal 14. The negative terminal 14 is connected in series with the on-off switch 16. The switch is of the momentary, normally open, S.P.S.T. type. The upper terminal of a photoresistor 18 is connected to the positive terminal 10 of battery 12. The photoresistor may be of a conventional CdS type. The lower terminal of the photoresistor is connected to the non-inverting input 20 of a conventional operational amplifier 22. A reference resistor 24 is connected between the positive terminal 10 of battery 12 and the inverting input 26 of the operational amplifier 22. The output of the operational amplifier is series connected with the meter 28 which serves as the readout meter of the present invention and which externally appears as shown in FIG. 1. A feedback loop is created from the output of the meter 28 and includes the cathode 30 and anode 32 of logging diode 34. While diodes are shown in the present embodiment, it is appreciated that any logging means may be used, particularly unidirectional conducting means such as diodes, transdiodes (a transistor with a grounded base terminal) and diode connected transistors. The anode 32 is connected back to the inverting input 26 of the operational amplifier 22. A positive power supply potential is applied along lead 35 to the operational amplifier 22. A negative power supply potential is provided along lead 48 to the operational amplifier 22.

A variable resistor 36 is connected to the junction point of cathode 30 of diode 34 and the output from meter 28. The variable resistor serves as a "gain adjust" for the meter 28. A resistor 38 is series connected with the variable resistor 36 and limits the current flowing through the variable resistor 36.

A voltage divider is created across the output of the battery 12. This voltage divider includes LED's 42 and 44 which are series connected between the positive terminal of battery 12 and a junction point 40. This junction point is connected to the negative terminal 14, through switch 16 and voltage divider resistor 46. By utilizing the voltage divider including the LED's and resistor 46, both inputs of the operational amplifier and the meter output are all referenced to the voltage divider. This serves as a regulated dc voltage supply insensitive to battery voltage variation. The LED's 42 and 44 not only provide a regulated operating voltage thereacross but also provide sufficient light to act as panel illuminators for meter 28 when located as indicated in FIG. 1. The emitted light may be green, which is excellent due to its high visibility for a given battery drain current in a photographic dark room.

The inclusion of meter 28 in a feedback loop obviates a second operational amplifier as would be required in a conventional meter-drive circuit. The artifice of placing the meter in series with the amplifier output is made possible by the recognition that the current in diode 34 is both constant and negligibly small compared with the meter current. That is, $i_2$, the current which flows in the reference resistor 24 and the logging diode 34 is a constant value on the order of one microampere; it thus introduces negligible error to the meter current which is 1,000 microamperes full scale. The error incurred is thus a constant and 20 times smaller than the 2 percent accuracy for which the instrument is designed.

As shown in FIG. 2, LED's 42 and 44 are placed in one part of a voltage divider providing a positive supply voltage for op amp 22. Resistor 46 is in the other part of the divider and provides the negative supply for amplifier 22. Thus, as battery 12 fails, the voltage across the LED's remains constant (i.e., regulated) while the voltage across resistor 46 falls, so that amplifier 22 loses its negative supply. Therefore, the meter reading remains positive even in a darkened situation.

Accordingly, by virtue of the logarithmic nature of the meter current, 1 milli-footcandle should read 0, and lesser amounts of illumination should provide negative readings. In the absence of any illumination, the meter should be pegged in the negative direction. When the battery has failed, however, testing by use in total darkness will not produce the negative reading, but an erroneous positive reading.

As will be noted, the circuitry of FIG. 2 is completed by the connection of a logging diode 56 in the circuit. Particularly, the anode 52 is connected to the lower terminal of photoresistor 18 while the cathode 54 is connected to the junction point 40.

In terms of a brief circuit analysis for FIG. 2, the following relationships pertain:

Referring to the anode-cathode voltage drops across diodes 56 and 34 as $v_{d1}$ and $v_{d2}$, respectively, it is seen that $$v_o = v_{d1} - v_{d2}, \qquad (1)$$

inasmuch as the operational amplifier maintains the voltages at terminals 20 and 26 substantially equal. Further, since the input currents on terminals 20 and 26 are negligible, approximately equalling 10 nA for a 741 amplifier, it is also true that the currents in diodes 56 and 34, $i_{d1}$ and $i_{d2}$, respectively, are approximately equal to $i_1$ and $i_2$, respectively. Thus, utilizing the logarithmic voltage-current relationship of diodes 56 and 34, Equation 1 becomes $$v_o = E_o[\log(i_1/I_{o1}) - \log(i_2/I_{o2})] \qquad (2)$$

where $E_o$ is the volt-equivalent of temperature (see, for example, Section 6—6 in *Electronic Devices and Circuits*, Millman & Halkias, McGraw-Hill, 1967) and $I_{o1}$ and $I_{o2}$ are the saturation currents of diodes 56 and 34.

Where matched diodes are used, $I_{o1}$ equals $I_{o2}$, and Equation 2 becomes $$v_o = E_o \log i_1/i_2 \qquad (3)$$

Recalling that the potentials at the terminals 20 and 26 are approximately equal, the difference potential of approximately 1 mV is negligible in comparison to the excitation voltage V, which approximates 4 V for the circuit components chosen. Equation 3 then becomes $$v_o = E_o \log \frac{V/R_1}{V/R_2} = E_o \log \frac{R_2}{R_1} \quad (4)$$

The conductance of photoresistor 18 may be expressed as follows:

$$G_1 = 1/R_1 = kE \quad (5)$$

where k is a constant and E is an expression of the illumination falling upon the photoresistor expressed in a unit such as the footcandle.

By substituting the expression for conductance in Equation 4, the logarithmic relationship may be expressed as follows:

$$v_o = E_o \log (R_2/R_1) = E_o \log (kR_2E) \quad (6)$$

Equation 6 may be used to describe the current in meter 28, $i_m$. Where the meter is a 1 milliampere movement, the input current to op amp 22, being on the order of several nanoamperes, may be neglected (with far less than 1 percent error). Thus $$i_m = (v_o/R_3) - i_2 \quad (7)$$

Here $R_3$ represents the series equivalent of resistors 36 and 38. Moreover, where $R_3$ is selected to be approximately 200 ohms and $R_2$ approximately 2.7 megohms, it is clear that $i_2$ may be neglected in Equation 7. Substitution of Equation 6 in Equation 7 yields for the meter current $$i_m = (E_o/R_3) \log (kR_2E) \quad (8)$$

It is seen that $R_3$ serves as a "gain control" for the meter, and that the meter deflection is proportional to the logarithm of the illumination, permitting the meter to be directly calibrated in f/stops. Additionally, the voltage of source 12 is not a factor in the final equation, since the equations are independent of the applied potential. Accordingly, a common battery, such as a 9-volt "transistor" battery, may be used in the present apparatus in lieu of the more expensive, extremely stable sources, such as mercury cells, which might otherwise be required.

For the case of unmatched diodes, practically important because of production economics, it can be shown analytically that the above complete independence of excitation voltage V no longer obtains. In the present invention it is one of the functions of the LED's 42 and 44 to provide a regulated excitation voltage V in the presence of wide variations of voltage of the battery 12, nominally 9 V.

As will be appreciated from an understanding of the present invention, a simple, reliable and extremely economical electronic photometer results which is capable of precisely measuring preselected small areas of an image or of an illumination field or light flux.

The preceding specification describes, by way of illustration and not of limitation, a preferred embodiment of the invention. Equivalent variations of the described embodiment will occur to those skilled in the art. Such variations, modifications, and equivalents are within the scope of the invention as recited with greater particularity in the following claims, when interpreted to obtain the benefits of all equivalents to which the invention is fairly entitled.

I claim the following:

1. A circuit providing an output voltage proportional to the logarithm of the ratio of two resistors and substantially independent of the supply voltage therefor comprising:
   (a) a power source;
   (b) first resistance means connected to said power source;
   (c) second resistance means connected to said power source;
   (d) operational amplifier means having first and second inputs and an output, said first input connected to said first resistance means and said second input connected to said resistance means;
   (e) means connected to the output of said operational amplifier means for referencing an input of said operational amplifier to a predetermined voltage;
   (f) first and second logging diodes, each connected between a respective input of said operational amplifier means and the output thereof; and
   (g) indicating means connected to the output of said operational amplifier for indicating the logarithm of the ratio of said first and second resistance means.

2. An electronic photometer comprising:
   (a) an operational amplifier having first and second signal inputs and an output;
   (b) a power source;
   (c) photoresistive means exposed to incident light and connected between said power source and said first input;
   (d) additional resistive means connected between said power source and said second input;
   (e) meter means connected to the output of said operational amplifier for displaying output current from the operational amplifier, said meter means having an output; and
   (f) first and second logging means, each connected between a corresponding input and the output of the operational amplifier for causing said meter to display a function of currents in said photoresistive means and in said additional resistive means, said function being dependent on said photoresistive and said additional resistive means and being substantially independent of the power source voltage.

3. A photometer as recited in claim 2 wherein said function comprises a logarithm of the ratio of said currents.

4. A photometer as recited in claim 3 wherein said function comprises a logarithm of the ratio of said resistive and photoresistive means.

5. A photometer as recited in claim 4 wherein said meter displays an f-stop reading for light incident upon said photoresistive means.

6. A photometer as recited in claim 2 further comprising means connected to the output of said meter means for referencing an input of said operational amplifier to a predetermined voltage.

7. A photometer as recited in claim 6 wherein said referencing means comprises at least one light-emitting diode connected in a resistive path across the power source for providing a reference for said operational amplifier input.

8. A photometer as recited in claim 7 wherein said light-emitting diode produces illumination during operation of the photometer.

9. A photometer as recited in claim 7 wherein said light-emitting diode further produces an indication of usefulness of said power source.

10. A photometer as recited in claim 7 further comprising a housing for enclosing the components of the photometer, the light-emitting diode being mounted in proximity to the meter means for enabling visual reading of the meter in a darkened environment.

11. A photometer as recited in claim 2 further comprising variable resistive means connected to the output of said meter for gain adjusting the meter.

* * * * *